United States Patent [19]

Baroody

[11] 4,386,870
[45] Jun. 7, 1983

[54] STRUCTURAL TEE JOINT

[76] Inventor: Terrance A. Baroody, 2127 Foxwood Dr., Orange Park, Fla. 32073

[21] Appl. No.: 208,158

[22] Filed: Nov. 19, 1980

[51] Int. Cl.³ ............................................... F16B 7/00
[52] U.S. Cl. ................................... 403/234; 403/260
[58] Field of Search ............... 403/234, 237, 233, 260; 411/403, 178, 113, 108

[56] References Cited

U.S. PATENT DOCUMENTS

| 1,460,928 | 7/1923 | Tilden | 403/260 X |
| 2,065,902 | 12/1936 | Levin | 403/237 |
| 3,674,293 | 7/1972 | Parsons | 403/234 |
| 4,083,641 | 4/1978 | Sado | 403/260 |
| 4,261,667 | 4/1981 | Ervin et al. | 403/237 X |

FOREIGN PATENT DOCUMENTS

| 449331 | 4/1968 | Switzerland | 411/178 |
| 448527 | 6/1936 | United Kingdom | 403/234 |
| 1261188 | 1/1972 | United Kingdom | 403/234 |

Primary Examiner—Andrew V. Kundrat
Attorney, Agent, or Firm—Arthur G. Yeager

[57] ABSTRACT

A tee joint in a tubing structure including a running tubing member and an abutting tubing member forming a tee joint, a transitional connector having a saddle shape to receive therein the running tubing member on one side thereof and a recess on the other side thereof to receive the end of the abutting tubing member, a tapered plug threadedly connected into the end of the abutting tubing member with a nut encapsulated in the plug, and a bolt passing through and joining the running tubing member to the nut.

23 Claims, 4 Drawing Figures

STRUCTURAL TEE JOINT

BACKGROUND OF THE INVENTION

Tubing and piping are frequently used to make various structures, e.g. scaffolding, furniture, framing, etc. Such structures inevitably require the use of a tee joint wherein one piece of tubing abuts directly into a second piece of tubing at right angles to each other and the problem is to connect the two pieces into a rigid load carrying joint. There are common pipe or tubing tees which join the ends of three pieces of piping or tubing to form a tee joint. The present invention, however, is concerned with employing a single continuous tubing or piping and joining to it an abutting piece to make a tee joint.

Various constructions of tee joints have been produced in the prior art, among which are those illustrated by U.S. Pat. No. 949,108—Abel. Such a structure is produced by inserting into the end of the abutting tubing a special nut with a serrated circumference and to attach the continuous piece of tubing by means of a bolt through that tubing and engaged with such special nut. Similarily in U.S. Pat. No. 2,557,766—Ronfeldt there is such a special nut which has been formed into the end of the main tubing to hold it in place and at the same time form a partial saddle to engage the running tubing member. These devices require special nuts and the reforming of the tubing end to accommodate nuts and the piece of running tubing that is to be connected therewith.

Another construction which has been found in the prior art is illustrated by British Pat. Nos. 1,232,489—Smith and 1,497,532—Davies is to insert into the interior of the abutting tubing an expandable plug which serves as a nut, or which has a separate nut, for a connecting bolt, and as the bolt is screwed into this plug, it causes the plug to expand and to hold the plug against the inside surface of the tubing by friction.

Neither of the above two general types of construction is entirely satisfactory. The special nuts which are crimped into the end of the abutting tubing will eventually work loose and the joint will accordingly fail completely. Similarly, the expanding plugs have a tendency to become loose with time and thus to weaken the frictional forces holding the plug in place, thereby causing that type of joint to fail.

Other prior art having pertinency to this invention which were found in the search thereon are U.S. Pat. Nos. 468,963—Campbell; 501,935—Harsha; 2,972,495—Yalen; 3,519,292—Krikorian; 4,008,971—Wah et al; 4,013,372—Lay et al; and 4,083,641—Sado. None of these patents disclose or teach the invention embodied herein either alone or in any appropriate combination with any of the prior art known nor does the art alleviate the shortcomings of the prior art in the improved and effective manner set forth herein.

Accordingly, it is a general object of the present invention to provide a new and improved structural tee joint for tubing or piping. A specific object of this invention is to provide such a tee joint having a greater stability and durability than other known joints of this type. Another specific object of this invention is to provide a structural tee joint for use with plastic tubing which greatly rigidifies structures created therefrom. Other objects and advantages will appear from the more detailed description of this invention which is set forth hereinafter.

BRIEF SUMMARY OF THE INVENTION

The improved tee joint in the tubing structure includes a running tubing member and an abutting tubing member to be formed into a tee joint, a transitional connector having a saddle shape on one side thereof to receive the outside of the running tubing member and fitted with a recess to receive the end of the abutting tubing member, a tapered plug with male threads connected within female threads in the correspondingly tapered end of the abutting tubing member and encapsulating a nut therewithin; and a threaded bolt joining the running tubing member to the nut affixed to the plug which is connected to the abutting tubing member.

In specific embodiments of this invention the tubing is plastic, e.g. polyvinyl chloride; the threaded plug is preferably of common A.B.S. (Acrylonitrile-Butadiene-Styrene) material and has a recess to receive a wrench for tightening the plug; and the connecting bolt head is coated with an A.B.S. material, and the saddle connector is molded of A.B.S. material.

BRIEF DESCRIPTION OF THE DRAWINGS

The novel features believed to be characteristic of this invention are set forth with particularity in the appended claims. The invention, itself, however, both as to its organization and method of operation, together with further objects and advantages thereof, may best be understood by reference to the following description taken in connection with the accompanying drawing in which:

DETAILED DESCRIPTION OF THE PREFERRED EMBODIMENT OF THE INVENTION

Figure 1:
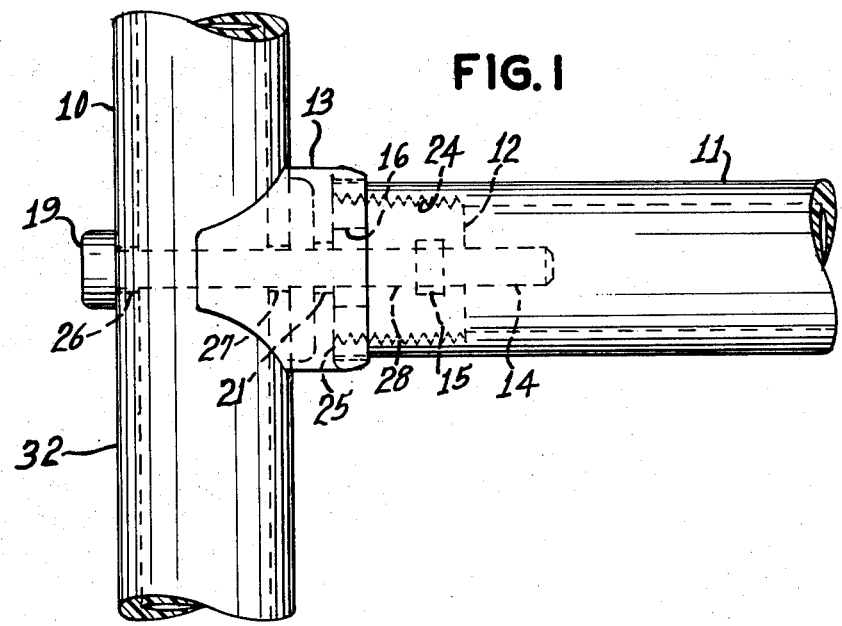
FIG. 1 is a plan view showing a tee joint of this invention.

The tee joint connector to which this invention relates joins a running tubing member 10 with an abutting tubing member 11. The improved transitional connector comprises three separate component parts; namely a saddle member 13, a plug 12 and a bolt 14. Plug 12 is joined to member 11 by a threaded connection, the male threads 22 being on the outer surface 23 of plug 12 and the female threads 24 being internally of member 11. Saddle member 13 includes recesses or seats 17 and 18 for both tubing members 10 and 11 that are to be joined in a tee configuration. A semicircular seat 18 is provided for member 10 and a recess 17 is provided to receive the end 25 of member 11 thereinto. The two members 10 and 11 are joined to each other in a rigid structure by means of a threaded bolt 14 passing through aligned holes 26 and 27 in the wall 32 of the tubing member 10, through a hole 21 centrally of saddle 13 and through an axial bore 28 in plug 12 to threadedly mate within nut 15 which is embedded in plug 12. By tightening bolt 14 into nut 15 the joint is made to be rigid and stable. Plug 12 is tightly joined to tubing member 11 by a threaded connection and by gluing the parts together which renders this tee construction extremely stable with substantially no possibility that it will become loosened over long periods of use.

Figure 2:
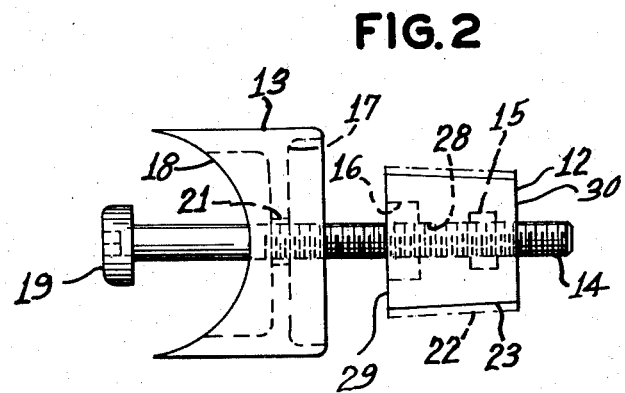
FIG. 2 is a plan view of the connector of this invention.
Figure 4:
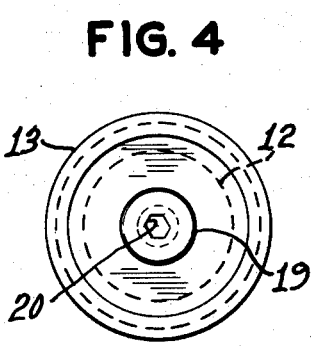
FIG. 4 is a top view of the connector shown in FIG. 2.
Figure 3:
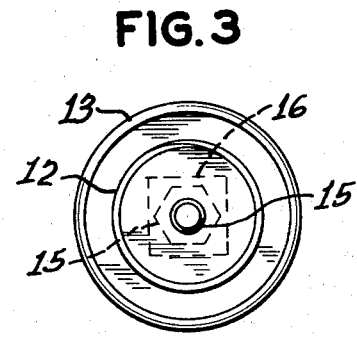
FIG. 3 is a bottom view of the connector shown in FIG. 2.

The structural details of the component parts of the connector are seen in FIGS. 2-4. Saddle member 13 is molded cylindrical piece of A.B.S. material having a semi-circular seat 18 to fit the outer surface of wall 32 of running tubing 10. At right angles to the longitudinal axis of tubing member 10, a shallow recess 17 is provided to fittingly and snuggly receive the end 25 of abutting tubing member 11. As illustrated in the drawings, tubing member 10 and tubing member 11 are both of the same size, but it is to be understood that different sizes may be joined to each other and, if such should be the case the size and shape of seat 18 and of recess 17 would be made of suitable sizes to snuggly fit the two pieces of tubing to be joined. In alignment with the longitudinal axis of member 11, a hole 21 is provided generally centrally of saddle member 13 to permit the shank of bolt 14 to pass therethrough, such hole 21 being in alignment with holes 26 and 27 of member 10.

Plug 12 is preferably of a generally solid structure of A.B.S. material with male pipe threads 22 or other screw threads on its outer surface 23 and a bore 28 extending through the longitudinal axis of the plug 12 to admit the shank of bolt 14. Embedded in the interior of plug 12 along its longitudinal axis is a nut 15 having the appropriate female threads to match the male threads on bolt 14. Plug 12 is preferably slightly tapered from the enlarged outer end 29 to the smaller inner end 30, so that upon sufficient tightening of the plug 12 into the end of tubing member 11, a rigid connection is obtained. In order to provide a means for tightening plug 12 into the end of tubing member 11, it is preferable for a recess 16 to be provided in the end 29 of plug 12 to receive a wrench therein which can then be rotated to turn the plug 12 to completely tighten the plug 12 into tubing member 11. If desired glue may be applied to plug threads 22 and after tightening of plug 12 fully into tubing 11, the glue is permitted to set to provide a unitary structure between plug 22 and tubing 11. To enhance the overall appearance of the plugged end of tubing 11, it is preferable that the outer surface 29 of plug 12 be flush with the outer surface of end 25 of tubing member 11, and thus the entire flush end of tubing 11 can be inserted into recess 17 of saddle member 13 with a snug fit.

The bolt 14 must be sufficiently long to extend from the outside of running tubing member 10 to be threadedly connected to nut 15. The shank of bolt 14 passes through aligned openings 26 and 27 in tubing member 10, then through opening 21 of saddle member 13, through recess 16 and bore 28, and into nut 15 in plug 12.

In instances when the tee joint of this invention is employed in the manufacture of furniture or other structures which normally require an overall pleasing appearance, it is preferable to coat head 19 of bolt 14 with a material which closely simulates that of tubing members 10 and 11 or any other material which might be generally of the same external appearance such that a pleasing overall appearance is provided thereto. Bolt head 19 preferably includes some means for turning bolt 14 so as to engage the threads in nut 15. One such means shown herein is a hexagon recess 20 to receive an appropriate wrench. Any other means such as a slot for a screw driver would be equally operable and may be preferred in certain uses of the tee joint in accord with this invention.

Preferably tubing members 10 and 11 are made of a plastic, such as P.V.C. plastic, the component parts of the connector including saddle 13 and plug 12 will also be made of plastic, such as A.B.S. plastic as well as the coating for head 19 of bolt 14. Bolt 14 and nut 15 will normally be made of metal, such as steel or aluminum alloy as commonly employed in bolts and nuts. The tee joint structure of this invention is stable, produces a rigid joint, and has an overall pleasing appearance.

While the invention has been described with respect to a certain specific embodiment, it will be appreciated that many modifications and changes may be made by those skilled in the art without departing from the spirit of the invention. It is intended, therefore, with the appended claims to cover all such modifications and changes as fall within the true scope and spirit of the invention.

What is claimed as new and what is desired to secure by Letters Patent of the United States is:

1. A tee joint in a tubing structure comprising a running plastic tubing member and an abutting plastic tubing member to form a tee joint, a transitional plastic connecting means having a saddle shape on one side thereof to receive nestingly therein said running tubing member and a recess on the other side thereof to nestingly receive the end of said abutting tubing member, said connecting means including a plastic plug threadedly joined within said end of said abutting tubing member, said plug having an embedded metal nut therein, and said connecting means further having an elongated metal bolt passing through said running tubing member, and threadedly connected to said nut.

2. The tee joint of claim 1 wherein said plug is tapered.

3. The tee joint of claim 1 wherein said plug includes an outwardly exposed recess adapted to receive a wrench for tightening said plug into said end of said abutting tubing member.

4. The tee joint of claim 1 wherein the head of said bolt is coated with a plastic material generally simulating said plastic running tubing member.

5. The tee joint of claim 1 wherein said nut is completely encapsulated in said plug.

6. The tee joint of claim 1 wherein said running tubing member includes a pair of aligned openings to permit the passage of said bolt therethrough, said connecting means including a connector having an opening generally centrally therethrough between said saddle shape on said one side and said recess on said other side, in alignment with said pair of openings, said plug having a bore therethrough aligned with the opening of said nut and being in alignment with said pair of openings.

7. The tee joint of claim 6 wherein said plug includes an outwardly exposed recess when said plug is fitted within said end of said abutting tubing member adapted to receive a wrench for tightening said plug into said abutting end.

8. The tee joint of claim 1 wherein the outer surface of said plug connected to said end of said abutting tubing member is substantially completely threaded, said end of said abutting tubing member being internally threaded sufficiently such that the outer exposed end surface of said plug is flush with the outer exposed end surface of said end of said abutting tubing member.

9. The connector of claim 1 wherein said plug is tapered to provide a tight and threaded connection between said plug and said tubing end.

10. A connector for joining two pieces of plastic tubing into a structural tee joint which comprises
   a transitional plastic connector member having a saddle on one side thereof to receive the outside surface of a first piece of plastic tubing nestingly therein and having a recess on the opposite side thereof to abuttingly receive the end of a second piece of plastic tubing to form said tee joint;
   an elongated externally threaded plastic plug to mate with internal threads within said end of said second piece of tubing, said plug containing an embedded metal nut positioned generally along the axis of said plug; and
   an elongated headed and threaded metal bolt positioned generally along the axis of said second piece of tubing with its head outside of said first piece of tubing and its shank extending through aligned openings through the wall of said first piece of tubing, generally centrally through said saddle and said recess, and through an aligned bore generally centrally of said plug with its threads mating within the threads of said nut.

11. The connector of claim 10 wherein said plug includes an outwardly exposed recess adapted to fit a wrench for tightening said plug in said tubing end.

12. The connector of claim 10 wherein the head of said bolt is coated with a material generally simulating said first piece of tubing.

13. The connector of claim 10 wherein said nut is completely encapsulated in said plug.

14. The connector of claim 11 wherein the outer surface of said plug connected to said tubing end is substantially completely threaded, said abutting end of said second tubing being internally threaded sufficiently such that the outer exposed end surface of said plug is flush with the outer exposed end surface of said abutting end of said second tubing.

15. The connector of claim 10 wherein said plug is further affixed by settable glue in the threaded connection between said plug and abutting end.

16. A tee joint in a tubing structure comprising a running plastic tubing member and an abutting plastic tubing member to form a tee joint, a transitional connecting means having a saddle shape on one side thereof to receive nestingly therein said running tubing member and a recess on the other side thereof to nestingly receive the end of said abutting tubing member said connecting means including a plug tapered and threadedly joined within said end of said abutting tubing member, said plug having an embedded nut therein, and said connecting means further having an elongated bolt passing through said running tubing member, and threadedly connected to said nut.

17. A tee joint in a tubing structure comprising a running tubing member and an abutting tubing member to form a tee joint, a transitional connecting means having a saddle shape on one side thereof to receive nestingly therein said running tubing member and a recess on the other side thereof to nestingly receive the end of said abutting tubing member said connecting means including a plug threadedly joined within said end of said abutting tubing member, said plug having an embedded nut therein, said plug including an outwardly exposed recess adapted to receive a wrench for tightening said plug into said end of said abutting tubing member, and said connecting means further having an elongated bolt passing through said running tubing member, and threadedly connected to said nut.

18. A tee joint in a tubing structure comprising a running tubing member and an abutting tubing member to form a tee joint, a transitional connecting means having a saddle shape on one side thereof to receive nestingly therein said running tubing member and a recess on the other side thereof to nestingly receive the end of said abutting tubing member, said connecting means including a plug threadedly joined within said end of said abutting tubing member, said plug having an embedded nut therein, and said connecting means further having an elongated bolt passing through said running tubing member, and threadedly connected to said nut, said running tubing member including a pair of aligned openings to permit the passage of said bolt therethrough, said connecting means including a connector having an opening generally centrally therethrough between said saddle shape on said one side and said recess on said other side in alignment with said pair of openings, said plug having a bore therethrough aligned with the opening of said nut and being in alignment with said pair of openings, said plug including an outwardly exposed recess when said plug is fitted within said end of said abutting tubing member adapted to receive a wrench for tightening said plug into said abutting end.

19. A tee joint in a tubing structure comprising a running tubing member and an abutting tubing member to form a tee joint, a transitional connecting means having a saddle shape on one side thereof to receive nestingly therein said running tubing member and a recess on the other side thereof to nestingly receive the end of said abutting tubing member said connecting means including a plug threadedly joined within said end of said abutting tubing member, said plug having an embedded nut therein, and said connecting means further having an elongated bolt passing through said running tubing member, and threadedly connected to said nut, said plug and tubing members being plastic and said plug being tapered to provide a tight and rigid threaded connection between said plug and said abutting tubing member.

20. A connector for joining two pieces of tubing into a structural tee joint which comprises
   a transitional connector member having a saddle on one side thereof to receive the outside surface of a first piece of tubing nestingly therein and having a recess on the opposite side thereof to abuttingly receive the end of a second piece of tubing to form said tee joint;
   an elongated externally threaded plug to mate with internal threads within said end of said second piece of tubing, said plug containing an embedded nut positioned generally along the axis of said plug; and
   an elongated headed and threaded bolt positioned generally along the axis of said second piece of tubing with its head outside of said first piece of tubing and its shank extending through aligned openings through the wall of said first piece of tubing, generally centrally through said saddle and said recess, and through an aligned bore generally centrally of said plug with its threads mating within the threads of said nut, said saddle and said plug being of plastic materials simulating the material of said tubing pieces, said plug being tapered to provide a tight and threaded connection between said plug and said tubing end.

21. A connector for joining two pieces of tubing into a structural tee joint which comprises

- a transitional connector member having a saddle on one side thereof to receive the outside surface of a first piece of tubing nestingly therein and having a recess on the opposite side thereof to abuttingly receive the end of a second piece of tubing to form said tee joint;
- an elongated externally threaded plug to mate with internal threads within said end of said second piece of tubing, said plug containing an embedded nut positioned generally along the axis of said plug; and
- an elongated headed and threaded bolt positioned generally along the axis of said second piece of tubing with its head outside of said first piece of tubing and its shank extending through aligned openings through the wall of said first piece of tubing, generally centrally through said saddle and said recess, and through an aligned bore generally centrally of said plug with its threads mating within the threads of said nut, said plug including an outwardly exposed recess adapted to fit a wrench for tightening said plug in said tubing end.

22. A connector for joining two pieces of tubing into a structural tee joint which comprises

- a transitional connector member having a saddle on one side thereof to receive the outside surface of a first piece of tubing nestingly therein and having a recess on the opposite side thereof to abuttingly receive the end of a second piece of tubing to form said tee joint;
- an elongated externally threaded plug to mate with internal threads within said end of said second piece of tubing, said plug containing an embedded nut positioned generally along the axis of said plug; and
- an elongated headed and threaded bolt positioned generally along the axis of said second piece of tubing with its head outside of said first piece of tubing and its shank extending through aligned openings through the wall of said first piece of tubing, generally centrally through said saddle and said recess, and through an aligned bore generally centrally of said plug with its threads mating within the threads of said nut, said plug, connector and tubing pieces being plastic and said plug being further affixed by settable glue in the threaded connection between said plug and abutting end.

23. The connector of claim 22 wherein said bolt and nut are metal.

* * * * *